Aug. 8, 1950      H. A. STEVENSON      2,517,938
INDUSTRIAL TRUCK ATTACHMENT
Filed July 24, 1946      6 Sheets-Sheet 1
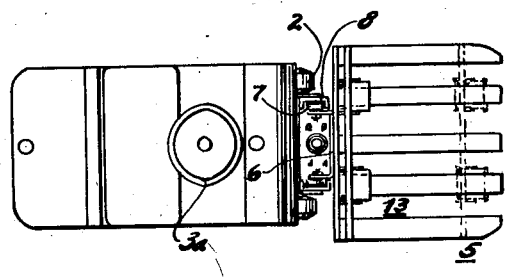
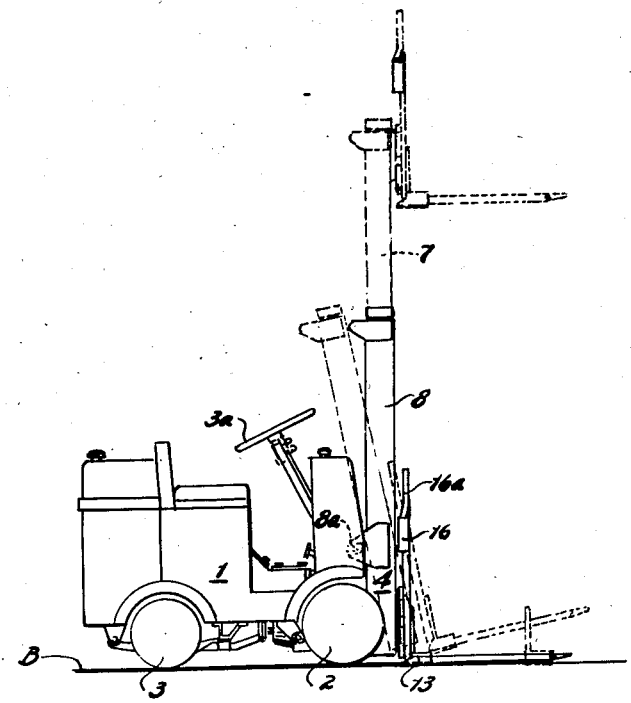
INVENTOR.
HERBERT A. STEVENSON.
BY Geo. B. Pitts
Attorney Aug. 8, 1950     H. A. STEVENSON     2,517,938
INDUSTRIAL TRUCK ATTACHMENT
Filed July 24, 1946     6 Sheets-Sheet 2
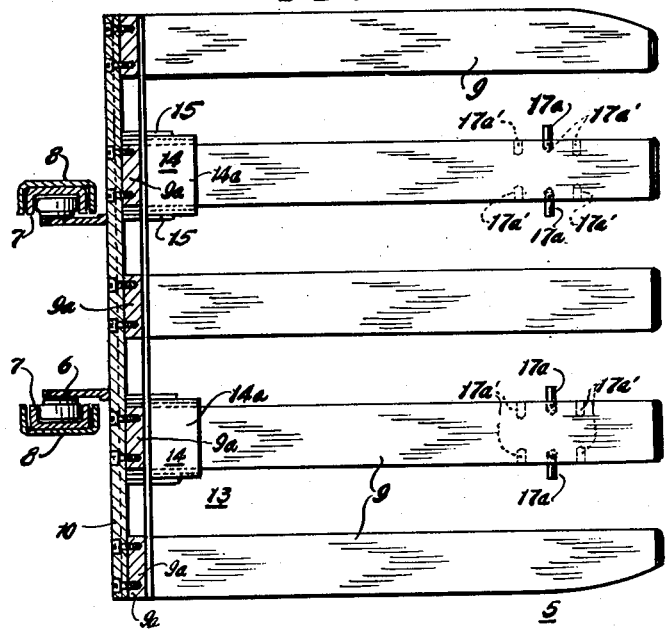
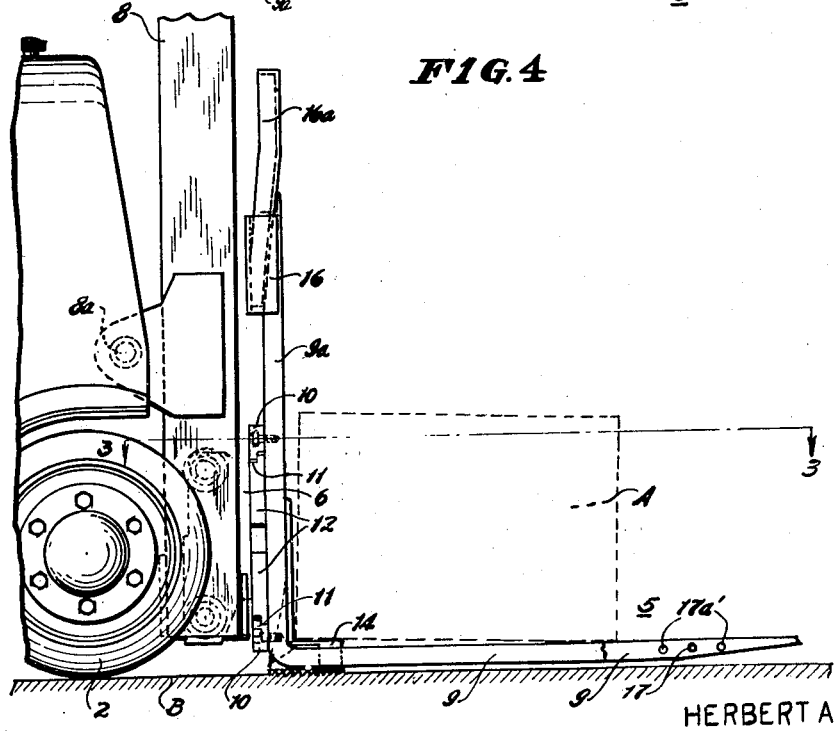
INVENTOR.
HERBERT A. STEVENSON.
BY Geo. B. Pitts
attorney

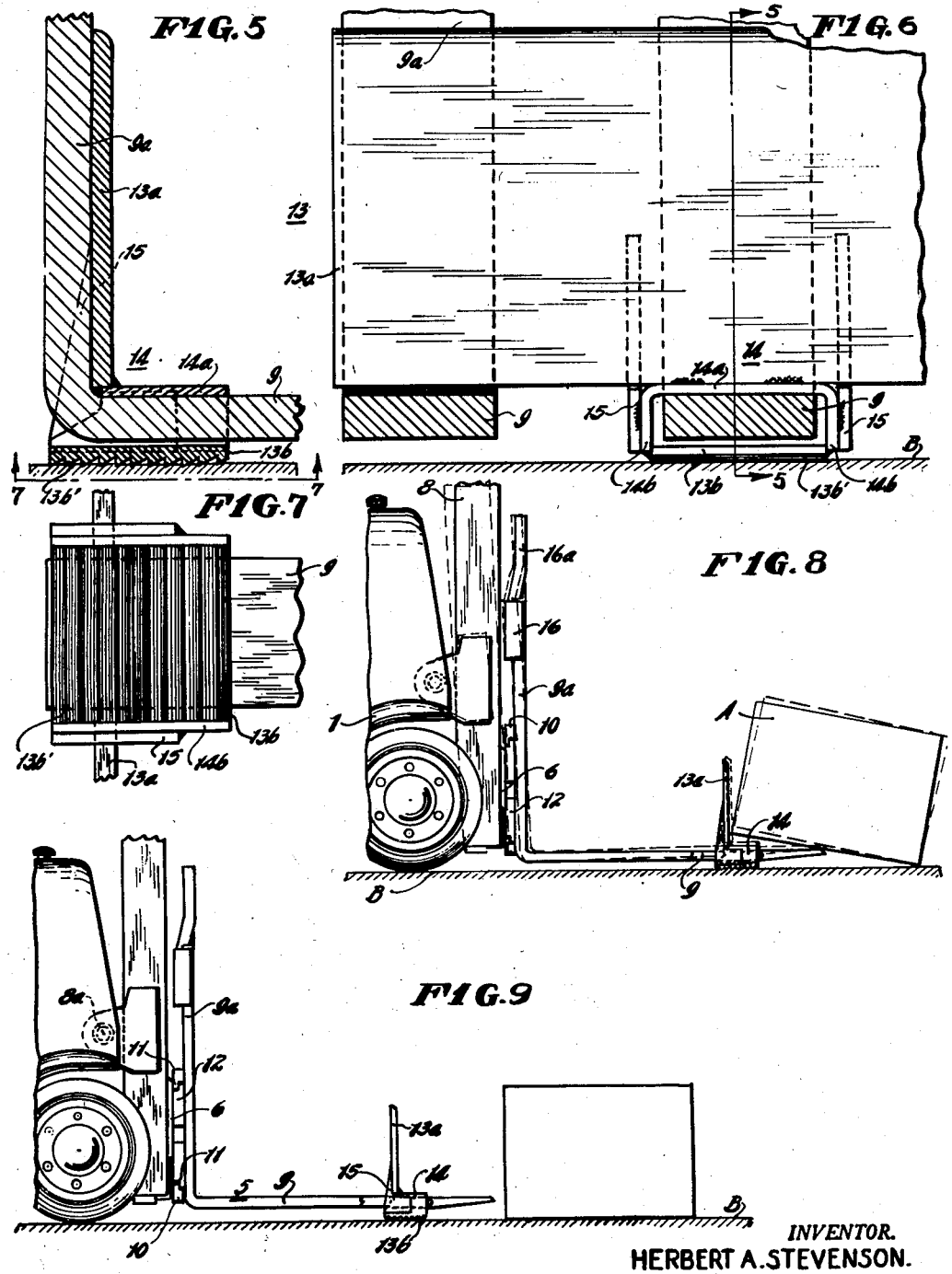

Aug. 8, 1950     H. A. STEVENSON     2,517,938
INDUSTRIAL TRUCK ATTACHMENT

Filed July 24, 1946     6 Sheets-Sheet 4

INVENTOR.
HERBERT A. STEVENSON.
BY Geo. B. Pitts
attorney

Aug. 8, 1950 H. A. STEVENSON 2,517,938
INDUSTRIAL TRUCK ATTACHMENT
Filed July 24, 1946 6 Sheets-Sheet 5
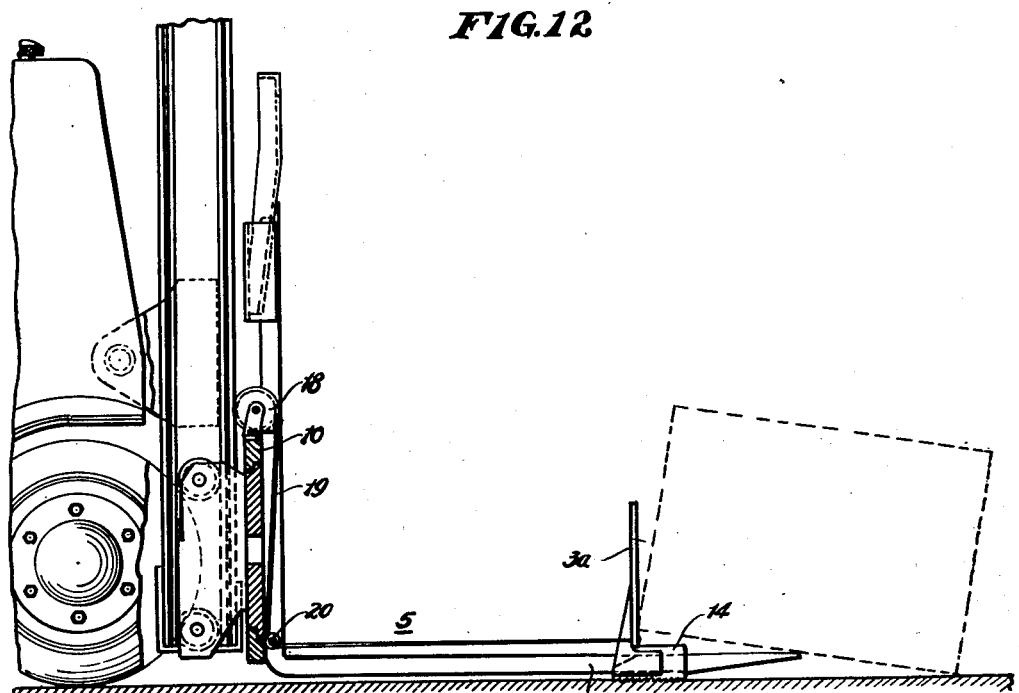
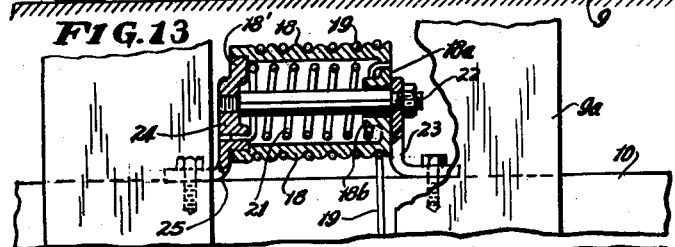
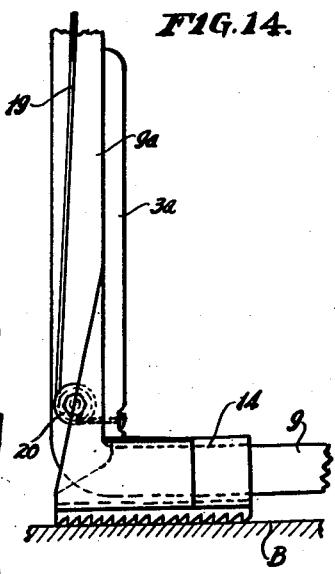
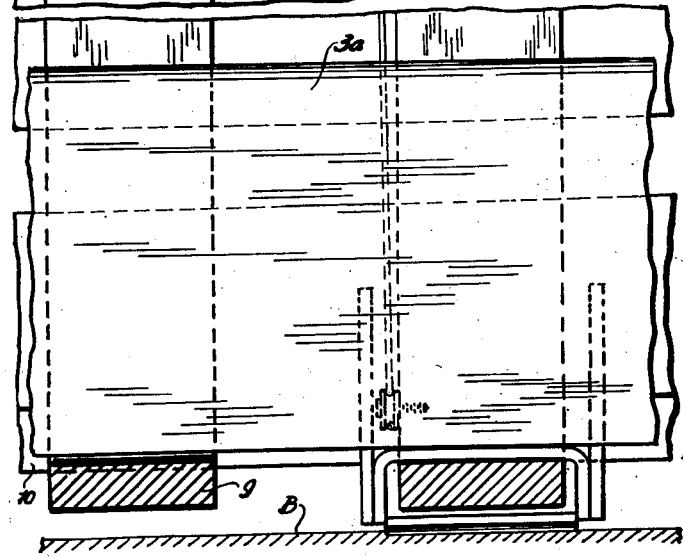
INVENTOR.
HERBERT A. STEVENSON.
BY Geo. B. Pitts
Attorney Aug. 8, 1950  H. A. STEVENSON  2,517,938
INDUSTRIAL TRUCK ATTACHMENT
Filed July 24, 1946  6 Sheets-Sheet 6
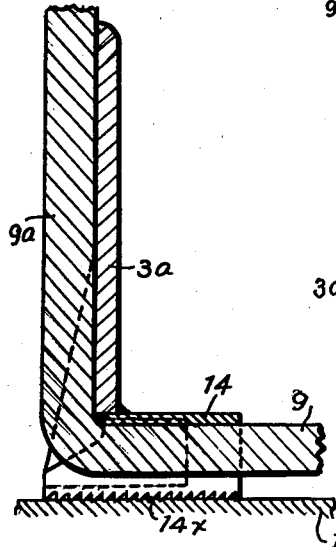
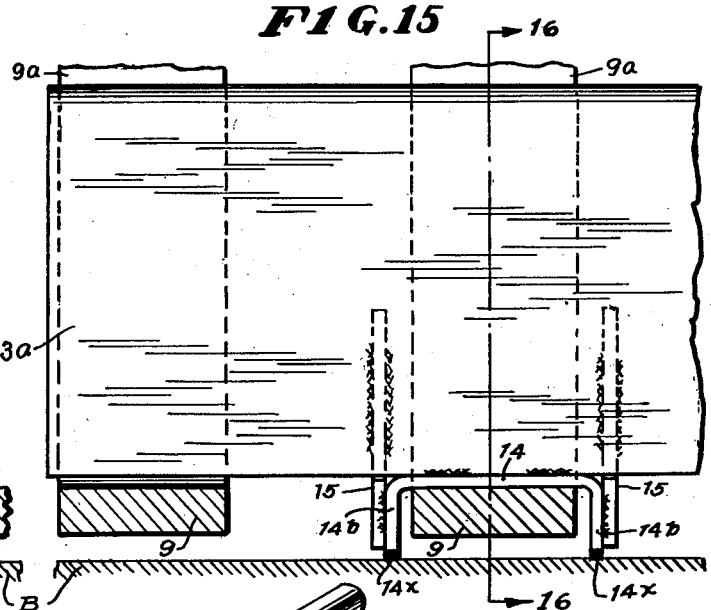
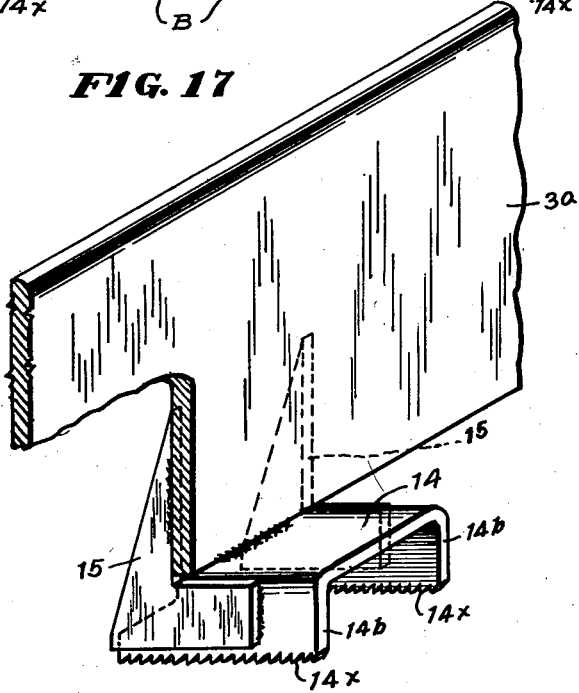
INVENTOR.
HERBERT A. STEVENSON
BY Geo. B. Pitts
Attorney Patented Aug. 8, 1950

2,517,938

UNITED STATES PATENT OFFICE 2,517,938

INDUSTRIAL TRUCK ATTACHMENT

Herbert A. Stevenson, Detroit, Mich.

Application July 24, 1946, Serial No. 685,827

18 Claims. (Cl. 214—113)

This invention relates to an industrial truck for transporting loads, more particularly to the carrier for the loads. In trucks of this type, as heretofore employed and according to my knowledge, it has been customary to mount the load on skids or pallets so that the load carrier could be projected below the latter and then elevated. The skid or pallet with the load thereon was then transported to the desired location, whereupon the carrier was lowered until the skid or pallet engaged the flooring or other surface, following which the truck was backed away. Aside from the cost of skids or pallets, in addition to that of the truck, in the system above referred to, this equipment required undue storage space when not in use, as well as waste of power in transporting the skids or pallets to and from their storage space. I have found that many different kinds of loads (for example, boxes, bales, cartons and bags of bulk materials) can be transported from place to place without the employment of skids or pallets; also, in certain conditions the use of skids or pallets is not only unnecessary but highly objectionable, for example, in loading freight cars, as such equipment would take up available space as well as increase the freight charges.

One object of the invention is to provide an improved industrial truck having a load carrier and means on the carrier for discharging or ejecting the load therefrom.

Another object of the invention is to provide for an industrial truck, an improved load carrier provided with means for discharging or ejecting loads therefrom.

Another object of the invention is to provide for an industrial truck an improved load carrier provided with a movable member arranged to engage with and be held against movement by the flooring, upon lowering of the carrier, so that the member forms an ejector to hold the load against movement with the carrier during withdrawal or backing of the truck.

Another object of the invention is to provide an attachment for the load carrier of a truck capable of sliding movement thereon to effect the discharge of a load from the carrier during backing of the truck.

Other objects of the invention will be apparent to those skilled in the art to which my invention relates from the following description taken in connection with the accompanying drawings, wherein Fig. 1 is a side elevation of an industrial truck (shown somewhat diagrammatically) having a load carrier embodying my invention.

Fig. 2 is a plan view.

Fig. 3 is a fragmentary section on the line 3—3 of Fig. 4, enlarged.

Fig. 4 is a fragmentary side elevation, showing the load carrier in lowered position.

Fig. 5 is a section on the line 5—5 of Fig. 6.

Fig. 6 is a fragmentary section on the line 6—6 of Fig. 3.

Fig. 7 is a bottom plan view of parts shown in Fig. 5, as indicated by the line 7—7.

Figs. 8 and 9 are fragmentary elevational views illustrating the operations of discharging a load from the carrier.

Fig. 12 is a view similar to Fig. 11, but showing the operation of discharging a load Fig. 13 is a fragmentary section on the line 13—13 of Fig. 11.

Fig. 14 is a fragmentary side elevation of parts shown in Figs. 10, 11, 12 and 13, enlarged.

Fig. 15 is a view similar to Fig. 5, but showing a different form of construction.

Fig. 16 is a section on the line 16—16 of Fig. 15.

Fig. 17 is a fragmentary perspective view of parts shown in Figs. 15 and 16.

Figure 10:
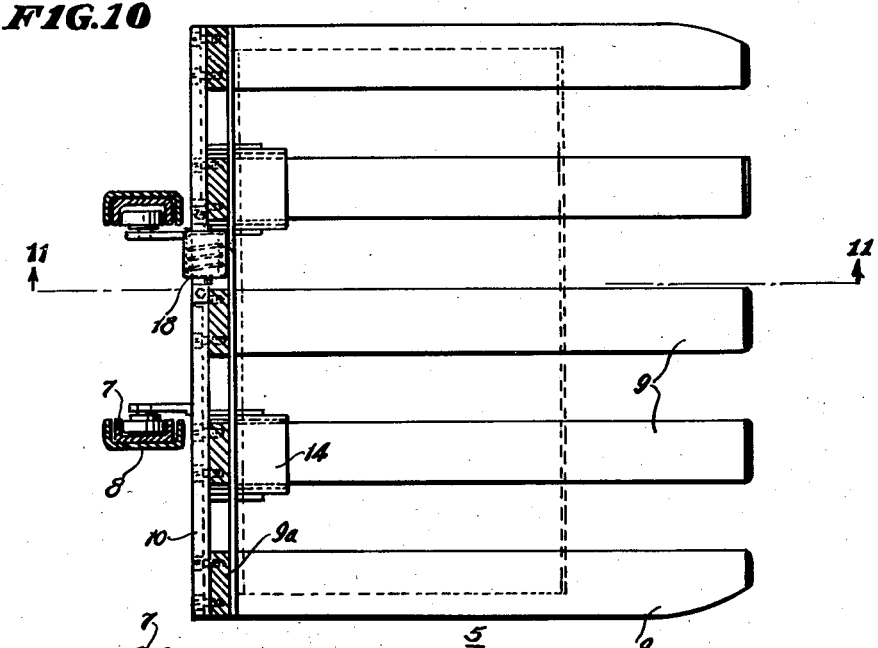
Fig. 10 is a section on the line 10—10 of Fig. 11 showing a modified form of construction.

In the drawings, 1 indicates a chassis or frame mounted on front wheels 2 and rear wheels 3, and 4 indicates as an entirety a raising and lowering mechanism, having a load carrier indicated as an entirety at 5, later referred to. By preference, the wheels 2 are power driven and the wheels 3 are steerable by operation of a wheel or other device 3a. The load carrier 5 is fixed to an elevating member 6 which slides in guides 7 and the latter are slidably mounted in channel members 8. The members 8 are pivotally mounted on the frame 1, as shown at 8a, whereby the channel members 8 and parts carried thereby may be tilted inwardly as shown in dotted lines (Figs. 1 and 8). The construction of the frame, mountings, driving and steering means for the wheels 2, 3, and the means for operating the elevating member 6, guides 7 and members 8 may be of any suitable construction and arrangement, but by preference and for illustrative purposes they are similar to like parts shown in the co-pending application of Paul E. Hawkins, Ser. No. 557,172, filed October 4, 1944, now Letters Patent No. 2,471,429, dated May 31, 1949.

The load carrier 5 preferably consists of a plurality of spaced forks 9 having upright arms 9a which are connected together by bars 10. The inner or opposed sides of the bars 10 are longitudinally recessed to provide flanges 11, which removably engage complementary shaped side walls provided on cross members 12, the latter being fixed to and forming part of the elevating member 6. The carrier 5 is positioned on the elevating member 6 by engaging the bars 10 with the cross members 12 and alining the complementary walls and sliding the bars 10 endwise relative to the cross members to position the carrier 5 in front of and with its lateral sides equal distances from the channel members 8.

Referring particularly to Figs. 1 to 9, inclusive, 13 indicates as an entirety means mounted on the carrier 5 for ejecting or discharging a load A therefrom. The load A is shown as consisting of a box or carton (two or more thereof may be disposed in stacked relation on the carrier), but it may consist of a bale or bag of bulk material (two or more thereof may be disposed in stacked relation on the carrier) or a load of a different shape. The ejecting or discharging means comprise the following: 13a indicates an upright plate which extends transversely of the load carrier and operates to eject the load in the manner later set forth. The ejector 13a is slidably mounted on the carrier, for relative movement thereon and is provided with one or more floor or surface engaging members 13b disposed below the carrier 5 and operable in the manner later set forth. Where the carrier 5 consists of spaced forks, the guide means for the ejector 13a consist of one or more shoes 14 preferably of inverted U-shape in cross section, each slidably fitting over one of the forks 9, so that its top wall 14a may slidably engage the top surface of the adjacent fork and its side walls 14b may engage the sides of the fork to guide the shoe 14 thereon. By preference two shoes 14 are provided between the ejector 13a and certain of the forks 9. Each shoe 14 extends outwardly from the arm 9a of the adjacent fork 9, so that when the truck is operated to effect engagement or pick-up of a load, the inner end of the latter will rest on the shoes 14. In this preferred arrangement of the shoes 14, the rear ends thereof are suitably welded to the ejector 13a and the opposite sides 14b of each shoe are connected to the ejector 13a by gussets 15. Each shoe 14 is provided with a floor engaging member 13b disposed below the adjacent fork 9 and suitably connected (preferably welded) at its opposite ends to the end edges of the side walls 14b, whereby these members may engage the floor or other surface B, as later set forth. The vertical height of the side walls 14b of each shoe 14 is greater than the thickness of the adjacent fork to permit the forks 9 to be slightly raised to relieve pressure on the floor engaging members 13b, whereby the forks may be readily withdrawn, as later set forth. Each member 13b consists of a plate preferably substantially equal in length to that of the adjacent shoe 14 and provided on its lower face with friction increasing means, preferably consisting of one or more transversely disposed depending ribs 13b' each of which may terminate in a relatively sharp edge to increase the friction between the member and flooring B, as will later be apparent. As later set forth, in moving the carrier 5 downwardly into load discharging position, the floor engaging members 13b engage the flooring B under pressure so that the relatively sharp terminating edges bite into the surface of the flooring B to insure a fixed relation therewith. As later set forth, as the floor engaging members 13b operate to prevent movement of the ejector 13a during withdrawal or backing movement of the truck, the inner face of each rib 13b' is disposed vertically and its opposite face is inclined upwardly and outwardly. In the form of construction shown, the entire lower face of the plate is provided with ribs 13b' in side-by-side parallel relation.

16 indicates sockets suitably fixed to the upper ends of certain or all of the arms 9a, each removably supporting an extension member 16a, these members being provided where the height of the loads to be transported is greater than the length of the arms 9a, so that when the channel members 8 are tilted rearwardly, and the load consists of stacked bodies, the upper body or bodies will not slide or gravitate off the lower bodies.

*Operation.*—The loads to be transported may be manually or otherwise positioned on the carrier 5, but are preferably assembled on stringers (not shown), so that the truck can be kept in service transporting one load while other loads are being assembled. With the ejector 13a in the position shown in Figs. 1, 2, 3, 4 and 5, the truck is operated to project the forks 9 and shoes 14 below an assembled load and then the carrier is elevated or tilted or it may be elevated and tilted and the truck driven to the load discharge location. With the load on the carrier, its inner end rests on the shoes 14 and its outer end or outer portion rests on the forks 9. It will be understood that the tilting of the carrier is not an essential operation, but may be utilized to facilitate driving of the truck at maximum speed when its carrier is loaded without danger of the load shifting or falling off the carrier. At the load discharge location the channel members 8 are moved into upright position (if previously tilted) and the load carrier 5 is then lowered until the floor engaging members 13b engage the flooring B under pressure and effect a "bite" engagement therewith, as shown in Fig. 4. Next, the raising and lowering mechanism 4 is operated to raise the carrier 5 a slight distance to disengage the forks from the members 13b to eliminate friction between the upper faces of the floor engaging members 13b and the adjacent forks 9 during withdrawal of the truck. Next, the truck is backed a predetermined distance to the position shown in Fig. 8. As the shoes 14 are frictionally secured to the flooring B and hold the ejector 13a stationary, such withdrawal movement of the truck serves to move or slide the forks 9 relative to the ejector 13a and as the latter is disposed on the inner side of the load, it prevents movement of the load with the forks; that is, the load rides the forks during this movement, the effect being to shift or slide the load relative to the forks until its outer end portion over-hangs the outer ends of the forks 9 and the latter recede to a position inwardly of the center of gravity of the load, whereby its outer end portion can gravitate into engagement with the flooring B, as shown in Fig. 8. During this withdrawal movement of the truck, the weight of the inner end of the load on the shoes 14 will prevent or tend to prevent disengagement of the floor engaging members 13b from the flooring B.

Limiting means, indicated as an entirety at 17, are provided to connect the shoes 14 to the carrier 5 when the truck has been withdrawn a predetermined distance, that is, far enough to position the outer ends of the forks 9 inwardly of the center of gravity of the load A to permit its outer end portion to gravitate, as shown in Fig. 8, and thus prevent disengagement of the ejector 13a from the adjacent forks. Next, the channel members are tilted inwardly or raised a slight distance, which operation moves the forks 9 upwardly (see dotted lines in Fig. 8) and the forks 9 carrying the shoes 14 in turn engage and raise the latter to release the members 13b from the flooring B. Next, the truck is again operated to withdraw it to the position shown in Fig. 9, thereby disengaging the forks from the load A, whereby the latter is discharged from the carrier. The ejector 13b is then slid inwardly to its normal position ready to eject a succeeding load.

In the form of construction shown in Figs. 1, 2, 3, 4, 8 and 9, the limiting means consists of a pin 17a removably mounted in an opening 17a' formed in each fork 9 on which one of the shoes 14 is mounted; the pin projects laterally from the adjacent fork so as to be in position to engage the shoe in the backing or receding movement of the forks, so that when the truck is backed to discharge the load, as shown in Fig. 9, the ejector 13a will move therewith. By preference, pins 17a, in alined relation, are mounted on opposite sides of those forks 9 on which the shoes 14 are mounted; also, these forks may be formed with sets of openings 17a', whereby the pins 17a may be positioned at different distances from the outer ends of the forks 9 dependent upon the length of the loads being transported.

Figure 11:
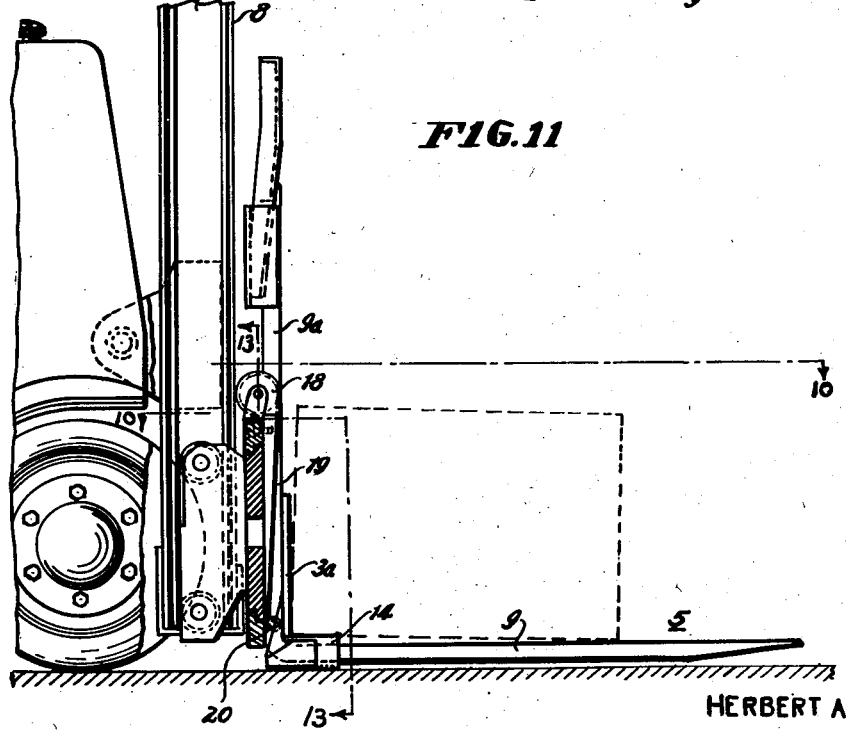
Fig. 11 is a section on the line 11—11 of Fig. 10.

Figs. 10, 11, 12, 13 and 14 illustrate a different form of limiting means for connecting the ejector to the carrier 5 upon withdrawal movement thereof a predetermined distance. These means comprise the following: 18 indicates a drum to which one end of a cable 19 is connected. The drum 18 is preferably mounted on the upper bar 10 between two forks 9. The cable 19 depends from the drum 18 and is reeved around a pulley 20 mounted on an adjacent arm 9a near its lower end, whereby the cable may extend to and be connected in a suitable manner to the ejector 13a adjacent the lower end of the latter; such connection is preferably detachable. The drum 18 is provided with a spring 21, which normally tends to rotate the drum in a direction to wind the cable 19 thereon, so that slack in the cable is at all times eliminated and when the ejector 13a is moved inwardly to its normal position, the cable is wound on the drum. When the ejector is secured to the flooring B and the carrier is being withdrawn the cable 19 unwinds from the drum. The cable 19 is of predetermined length, so that when the truck is operated to withdraw the carrier from the load far enough to shift its outer end portion beyond the outer end of the carrier, as shown in Fig. 12, the cable 19 will connect the ejector to the carrier 5, so that upon again operating the carrier to withdraw it from the inner end portion of the load, the cable will pull the ejector along with the carrier. The effective length of the cable may be varied by securing the inner end portion thereof to the drum at any point inwardly of its free end. It will be obvious that the drum 18 may be of any suitable construction, but for illustrative purposes, the wall of the drum is provided at one end with a head 18a. The head 18a is provided with a concentric collar 18b in which is mounted a bushing rotatably fitting a shaft 22. The adjacent end of the shaft 22 is fixedly mounted in a bracket 23, which is bolted to the adjacent bar 10. The opposite end of the shaft 22 is threaded into and fixedly secured to a disk 24, provided integrally with an extension 25 which is bolted to the adjacent bar 10. The periphery of the disk fits into an annular recess 18' formed in the opposite end of the drum wall and forms a bearing for the adjacent end of the drum. The spring 21 is mounted within the drum 18, one end of the spring being fixed to the head 18a and its opposite end being anchored in the disk 24.

Figs. 15, 16 and 17 illustrate a further modified form of construction wherein the depending side walls 14b of either or both shoes 14 are provided on their terminating edges with friction increasing means. These means are preferably provided by cutting away the metal of the edges as shown at 14x. As the vertical height of the side walls is greater than the thickness of the forks 9, the friction increasing means will engage the flooring B upon lowering of the carrier to load discharging position.

From the foregoing description it will be observed that the ejector forms an attachment for the load carrier of the truck and may therefore be applied to any truck having a raising and lowering mechanism and that the guide means for the ejector can be modified to adapt it to carriers of a different construction. It will also be observed that this attachment does not prevent the employment of the truck where the loads are supported on skids or pallets so that its range of usefulness is not impaired.

To those skilled in the art to which my invention relates many changes in construction and widely differing embodiments and applications of the invention will suggest themselves without departing from the spirit and scope of the invention. My disclosures and the description herein are purely illustrative and are not intended to be in any sense limiting.

What I claim is:

1. In a truck, the combination with a frame and propelling means therefor, of a raising and lowering mechanism on said frame and provided with a carrier for loads, a device supported on and extending transversely of said carrier and mounted for relative longitudinal movement thereon, and means on said device extending downwardly below said carrier and arranged to engage the flooring upon lowering of said carrier to its load discharging position to secure said device to the flooring, said device being normally disposed rearwardly of the load on said carrier and arranged to eject it from the carrier upon withdrawal of the truck.

2. A truck as claimed in claim 1, wherein said floor engaging means consist of a cross member supported by said device in a plane below the carrier and provided with friction increasing means for engaging the flooring.

3. A truck as claimed in claim 1 wherein the load carrier consists of a plurality of forks and the ejecting device is provided with a shoe slidably fitting one of said forks.

4. A truck as claimed in claim 1 wherein the load carrier consists of a plurality of forks, the ejecting device is provided with an inverted U-shaped shoe slidably fitting one of said forks and the floor engaging means consist of a cross member supported by the side walls of said shoe and provided with friction increasing means on its lower surface.

5. A truck as claimed in claim 1 wherein means are provided on the carrier for connecting the ejecting device thereto upon withdrawal of the truck a predetermined distance.

6. In a truck, the combination with a frame and propelling means therefor, of a raising and lowering mechanism on said frame and provided with a carrier for loads consisting of a plurality of forks, a device supported on said forks for vertical movement therewith and extending transversely of said forks and provided with a shoe slidably engaging one of said forks for relative longitudinal movement thereon, a member carried by said shoe and disposed in a plane below said forks for engaging the flooring when said carrier is lowered to its load discharging position to secure said device against movement relative to the flooring, said device being normally disposed rearwardly of the load on said carrier and arranged to eject it from the carrier upon withdrawal of the truck, and means on said carrier for connecting the shoe thereto upon withdrawal of the truck a predetermined distance.

7. In a truck, the combination with a frame and propelling means therefor, of a raising and lowering mechanism on said frame and provided with a carrier for loads consisting of a plurality of forks, a device supported on said forks and extending transversely thereof and provided with a shoe slidably engaging one of said forks for longitudinal movement thereon, a member carried by said shoe and disposed in a plane below said forks for engaging the flooring when said carrier is lowered to its discharging position to secure said device to the flooring, said device being normally disposed rearwardly of the load on said forks and arranged to eject it from the carrier upon withdrawal of the truck, and an element on the fork which is slidably engaged by said shoe for connecting the shoe thereto upon withdrawal of the truck a predetermined distance.

8. In a truck, the combination with a frame and propelling means therefor, of a raising and lowering mechanism on said frame and provided with a carrier for loads consisting of a plurality of forks, shoes supported on and slidably fitting certain of said forks for movement longitudinally thereof, an upright member extending transversely of said forks, secured to the inner ends of said shoes, said shoes and forks being arranged to support a load, and friction increasing means carried by one of said shoes in a plane below said forks and arranged to engage the flooring upon lowering of said forks to their load discharging position to secure said shoe to the flooring and prevent movement of said member relative to the flooring, said member being normally disposed rearwardly of the load when the latter is positioned on said shoes and forks and arranged to eject the load upon withdrawal of the truck.

9. In a truck, the combination with a frame and propelling means therefor, of a raising and lowering mechanism on said frame and provided with a carrier for loads consisting of a plurality of forks, shoes supported on and slidably fitting certain of said forks for movement longitudinally thereof, an upright member extending transversely of said forks, secured to the inner ends of said shoes, said shoes and forks being arranged to support a load, one of said shoes being of inverted U-shape the side walls of which extend to a plane below the adjacent fork, and a device fixed to the side walls of said U-shape shoe and supported thereby in a plane below the adjacent fork and arranged to be moved thereby, upon lowering of said forks to load discharging position, into engagement with the flooring under pressure to secure the shoe thereto and prevent movement of said member relative to the flooring, said member being normally disposed rearwardly of the load when the latter is positioned on said shoes and forks and arranged to eject the load upon withdrawal of the truck.

10. In a truck, the combination with a frame and propelling means therefor, of a raising and lowering mechanism on said frame and provided with a carrier for raising and lowering loads, an ejecting member slidably mounted on said carrier for movement longitudinally thereof and normally disposed at the inner end of said carrier for engagement with the rear side of the load when the latter is positioned on said carrier, and a device fixedly related to said member and disposed in a plane below said carrier and arranged to be moved by the carrier, upon lowering thereof into load discharging position into engagement with the flooring under pressure to secure said device to the flooring and member against movement relative to the flooring, whereby, upon withdrawal of the truck, said member engages the load and ejects it from said carrier.

11. In a truck, the combination with a frame and propelling means therefor, of a raising and lowering mechanism on said frame and provided with a carrier for loads, a member supported on said carrier when the latter is in an elevated position, said member being slidable longitudinally of said carrier and movable vertically relative thereto when said carrier is lowered into load discharging position, a member extending transversely of said carrier and fixedly related to said slidable member for movement therewith, and a device fixed to said first mentioned member and disposed in a plane below said carrier and arranged to engage the flooring upon lowering of said carrier into discharging position to secure said device to the flooring, said last mentioned member being normally disposed rearwardly of the load on said carrier and arranged to eject it therefrom upon withdrawal of the truck.

12. An attachment for a truck load carrier, which is mounted for movement upwardly and downwardly on the truck, consisting of spaced guide members adapted to be slidably supported on the carrier for movement longitudinally thereof, an upright member fixed to said guide members and supported thereby for movement into engagement with a load when the latter is positioned on the carrier, and a device carried by one of said members and extending to a plane below the carrier and arranged to engage the flooring, when the carrier is moved downwardly into load discharging position, to secure said guide member to the flooring and prevent movement of said upright member during withdrawal of the truck.

13. In a truck, the combination with a frame and propelling means therefor, of a raising and lowering mechanism on said frame and provided with a carrier for loads consisting of a plurality of forks, shoes slidably fitting certain of said forks and supporting at their inner ends an upright member extending transversely of said forks, said shoes and forks being arranged to support a load, one of said shoes being of inverted U-shape one side wall of which extends below the adjacent fork and is provided with friction increasing means arranged to engage the flooring upon lowering of said carrier into load discharging position to secure the shoe thereto and prevent movement of said member relative to the flooring, said member being normally disposed rearwardly of the load when the latter is positioned on said shoes and forks and arranged to eject the load upon withdrawal of the truck.

14. A truck as claimed in claim 1 wherein means are provided for connecting the ejecting device to the carrier upon withdrawal of the truck a predetermined distance, said connecting means consisting of a flexible member connected at its outer end to said device, a drum mounted on said carrier, the inner end of said flexible member being connected to said drum and arranged to wind thereon when said device is moved inwardly on said carrier and unwind from said drum during the withdrawal movement of the truck, and a spring normally tending to rotate the drum to wind the flexible member thereon.

15. In a truck, the combination with a frame and propelling means therefor, of a raising and lowering mechanism on said frame and provided with a carrier for loads, a mechanism mounted for relative longitudinal movement on said carrier and consisting of a device extending above the carrier and arranged to be disposed rearwardly of the load when the latter is positioned on said carrier and a device connected to said first mentioned device and extending to a plane below the carrier and adapted to engage the flooring, when the carrier is lowered into load discharging position, to secure said last mentioned device to the flooring and prevent movement of said mechanism relative to the latter upon withdrawal of the truck, whereby said first mentioned device shifts the load outwardly on said carrier.

16. A truck as claimed in claim 15 wherein means are provided on the carrier for limiting the outward longitudinal movement of said mechanism relative to the carrier upon withdrawal movement of the truck a predetermined distance.

17. In a truck, the combination with a frame and propelling means therefor, of a raising and lowering mechanism on said frame and provided with a carrier for loads consisting of a plurality of forks, a device extending transversely of said forks and provided with a shoe slidably engaging one of said forks for relative movement thereon and a member disposed in a plane below said forks for engaging the flooring when said carrier is lowered and secure said device against movement relative to the flooring, said device being normally disposed rearwardly of the load on said carrier and arranged to eject it from the carrier upon withdrawal of the truck, and an element on one of said forks for connecting the shoe to the carrier upon withdrawal of the truck a predetermined distance.

18. In a truck, the combination with a frame and propelling means therefor, of a raising and lowering mechanism on said frame and provided with a carrier for loads consisting of a plurality of forks, shoes slidably fitting certain of said forks and supporting an upright member extending transversely of said forks, one of said shoes being of inverted U-shape one side wall of which extends below the adjacent fork and is provided with friction increasing means arranged to engage the flooring upon lowering of said carrier into load discharging position to secure the shoe thereto and prevent movement of said member relative to the flooring, said member being normally disposed rearwardly of the load when the latter is positioned on said forks and arranged to eject the load upon withdrawal of the truck.

HERBERT A. STEVENSON.

REFERENCES CITED

The following references are of record in the file of this patent:

UNITED STATES PATENTS

| Number | Name | Date |
|---|---|---|
| 1,093,444 | Lewis et al. | Apr. 14, 1914 |
| 1,693,335 | Damerell | Nov. 27, 1928 |
| 1,896,543 | Gfrorer | Feb. 7, 1933 |
| 1,924,885 | Schreck | Aug. 29, 1933 |
| 2,258,180 | Hastings, Jr. | Oct. 7, 1941 |
| 2,393,902 | Hastings, Jr. | Jan. 29, 1946 |

FOREIGN PATENTS

| Number | Country | Date |
|---|---|---|
| 450,523 | Great Britain | Oct. 15, 1934 |